United States Patent [19]

Mori

[11] 4,389,085
[45] Jun. 21, 1983

[54] LIGHTING SYSTEM UTILIZING THE SUNLIGHT

[76] Inventor: Kei Mori, 3-16-3-501, Kaminoge, Setagaya-ku, Tokyo, Japan

[21] Appl. No.: 216,838

[22] Filed: Dec. 16, 1981

[30] Foreign Application Priority Data

| Feb. 22, 1978 | [JP] | Japan | 53-19439 |
| Mar. 9, 1978 | [JP] | Japan | 53-27065 |
| May 9, 1978 | [JP] | Japan | 53-54122 |
| May 30, 1978 | [JP] | Japan | 53-64775 |
| Jun. 14, 1978 | [JP] | Japan | 53-71844 |
| Jul. 3, 1978 | [JP] | Japan | 53-80630 |
| Aug. 19, 1978 | [JP] | Japan | 53-101307 |
| Oct. 16, 1978 | [JP] | Japan | 53-127184 |

[51] Int. Cl.³ .................................... G02B 5/172
[52] U.S. Cl. ......................... 350/96.10; 350/96.18; 350/258
[58] Field of Search ............ 350/96.10, 96.18, 258; 353/3; 237/1 R; 126/431, 438, 440

[56] References Cited

U.S. PATENT DOCUMENTS

| 2,022,144 | 11/1935 | Nicolson | 353/3 |
| 2,920,710 | 1/1960 | Howard | 350/96.10 |
| 3,535,018 | 10/1970 | Vasilatos | 350/96.24 |
| 3,656,844 | 4/1972 | Botskor | 353/3 |
| 4,078,548 | 3/1978 | Kapany | 350/96.10 |
| 4,195,907 | 4/1980 | Zamja et al. | 350/96.10 |
| 4,196,962 | 4/1980 | Sick | 350/96.10 |
| 4,201,197 | 5/1980 | Dismer | 350/96.10 |
| 4,289,118 | 9/1981 | Stark | 126/438 |
| 4,297,000 | 10/1981 | Fries | 350/96.24 |
| 4,297,521 | 10/1981 | Johnson | 126/438 |
| 4,302,069 | 11/1981 | Niemi | 350/96.10 |
| 4,312,330 | 1/1982 | Holdridge | 126/440 |
| 4,312,709 | 1/1982 | Stark et al. | 126/440 |
| 4,325,788 | 4/1982 | Snyder | 126/440 |

OTHER PUBLICATIONS

*NASA Tech. Briefs*, Summer 1978, Langley Research Center, Hampton, VA, Edwards, "Optics for Natural Lighting", pp. 209–211.

Primary Examiner—John D. Lee
Assistant Examiner—Frank Gonzalez
Attorney, Agent, or Firm—Burgess, Ryan and Wayner

[57] ABSTRACT

A lighting system utilizing the sunlight comprising in general an optical system for focusing the sun rays at a point, an optical transmission line consisting of optical conductor means with light diffusion holes for transmitting therethrough the focused sun rays to at least one desired point, and an optical system for redistributing the sun rays transmitted through the optical transmission line into at least one desired space or spot.

10 Claims, 34 Drawing Figures

FIG. 6

| WALL AREA | COLLECTION LENS INSTALLATION AREA | EFFECTIVE SUNLIGHT-EXPOSED AREA | COLLECTED SOLAR ENERGY | TRANSMISSION DISTANCE | REQUIRED QUANTITY OF OPTICAL FIBERS | COMPENSATED AREA |
|---|---|---|---|---|---|---|
| $S_W$ $S_W = H \times W$ | $S_L = a S_W$ $a$: INSTALLATION RATIO | $S_R = S_L \cos\theta$ $\theta$: ELEVATION | $P = p_0 S_R$ $p_0$: SOLAR ENERGY CONSTANT | $L$ | $L_F = \dfrac{P}{p_F} L$ $p_F$: POWER RATING | $S_C = \eta S_R$ $\eta$: TRANSMISSION EFFICIENCY |
| (EXAMPLE) $S_W = 50m \times 40m$ $= 2000 m^2$ | $a = 0.5$ $S_L = 1000 m^2$ | $\theta = 30°$ $S_R = 870 m^2$ | $p_0 = 0.5 KW/m^2$ $P = 435 KW$ | $L = 30m$ | $p_F = 0.1 mm^2$ $p_F = 0.1 Kw$ $L_F = 4350 \times 30m$ $= 130.5$ | $\eta = 0.7$ $S_C = 609 m^2$ |

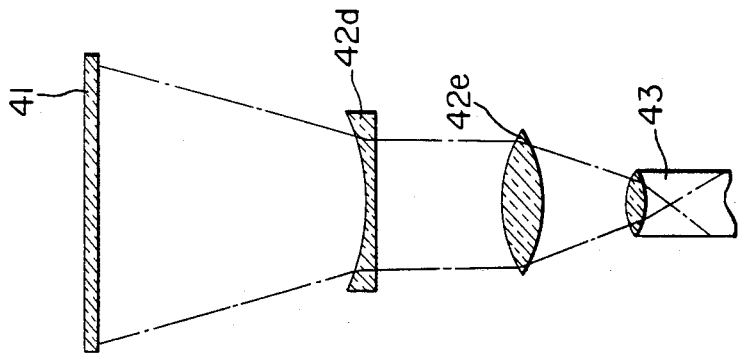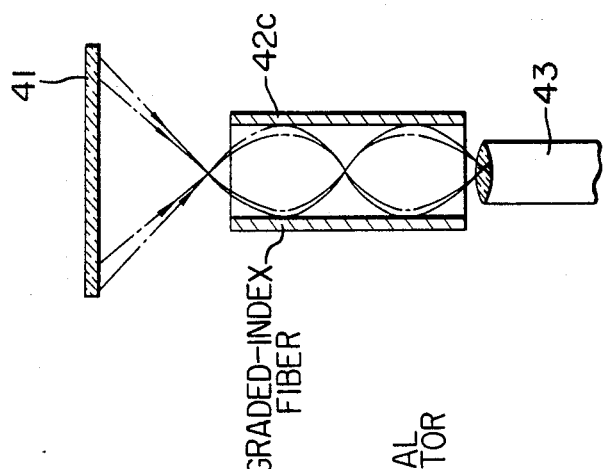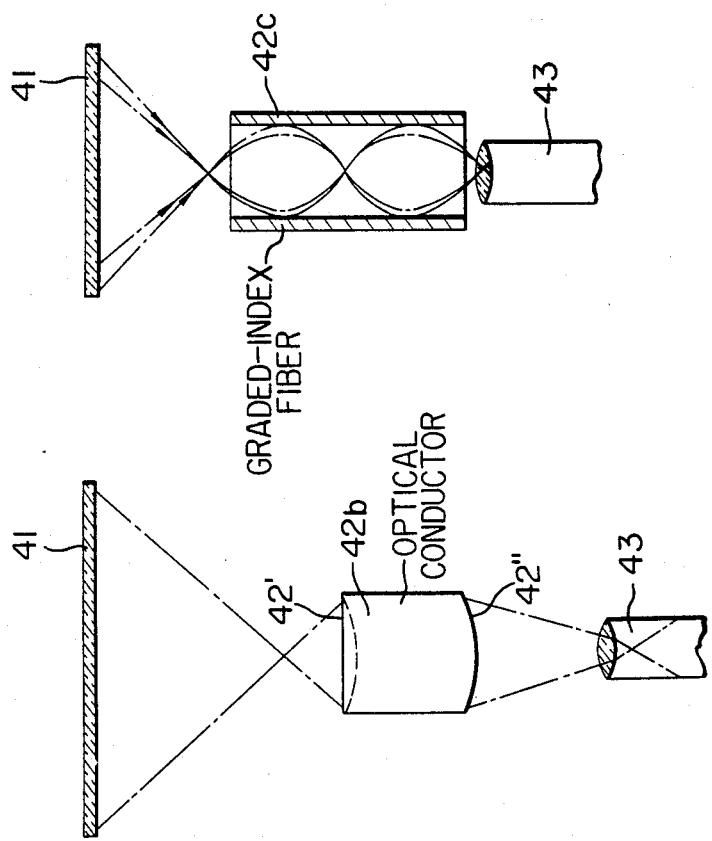

FIG. 22
FIG. 23
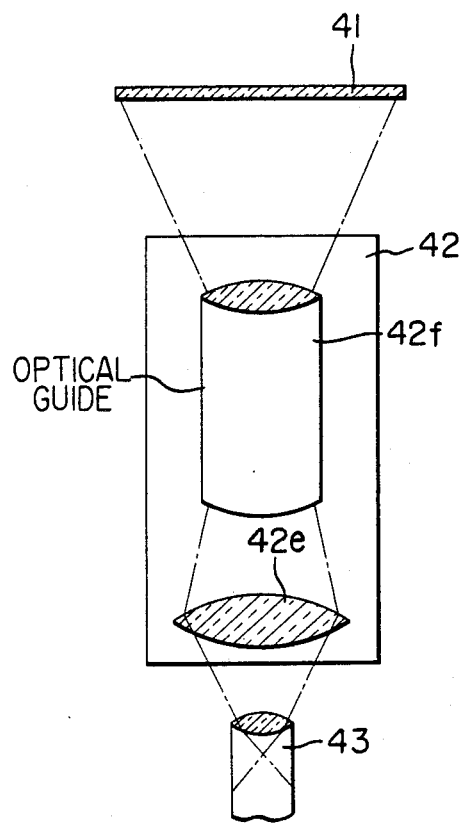
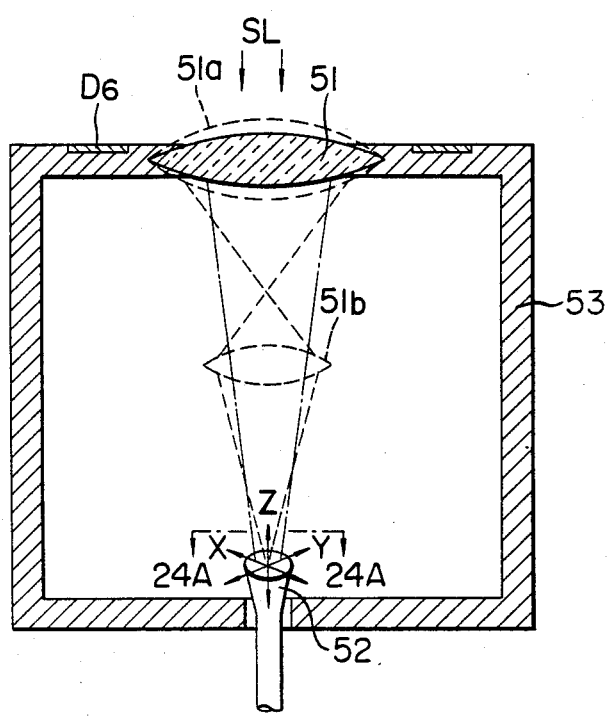

A1, A2: DIFFERENTIAL AMPLIFIER

D1~D4: LIGHT SENSORS

A1~A3: DIFFERENTIAL AMPLIFIER

D1~D5: LIGHT SENSORS

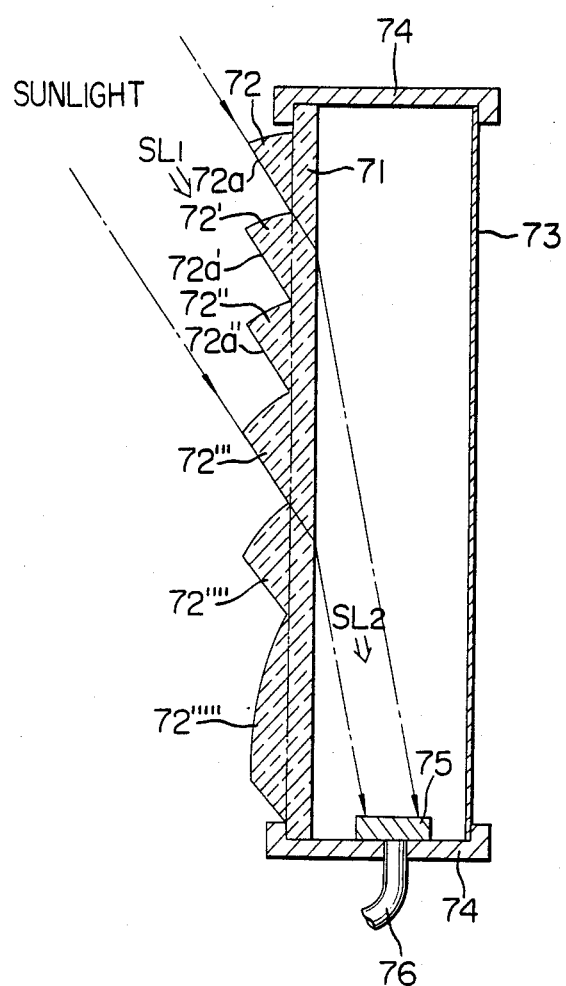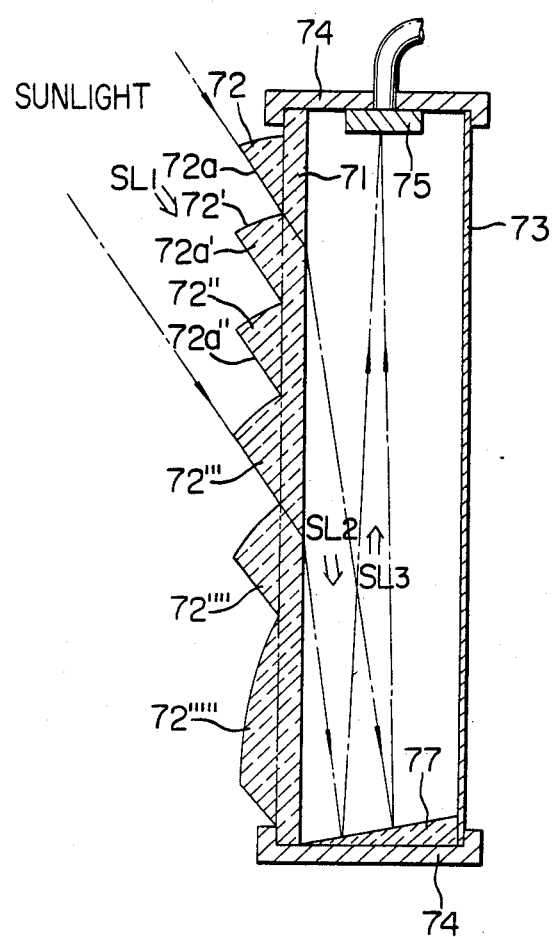

LIGHTING SYSTEM UTILIZING THE SUNLIGHT

This is a continuation, of application Ser. No. 10,053, filed Feb. 7, 1979, now abandoned.

BACKGROUND OF THE INVENTION

The present invention relates to a lighting system utilizing the sunlight, which may collect the sunlight at a place which is normally showered with the sun rays and transmit the collected sunlight to another place where the direct access to the sun rays is impossible.

Solar energy has been considered and is still considered to become available as the most promising and important source of infinite and pollution-free energy by the end of the 20th century for all the people living on the Earth. However, the solar constant is so low than an extremely large solar energy collection installation is required so that the collected solar energy may be converted into electrical energy in sufficient quantity so that it may be used successfully in practice. For instance, a large number of solar cells are arrayed in a vast area so as to convert the solar energy into electrical energy which in turn is transmitted to a desired destination.

Another serious problem encountered in the practical utilization of solar energy is a low conversion efficiency with which the solar energy is converted into electric energy. Furthermore, the electric energy thus obtained is further converted into other useful forms of energy such as mechanical energy, light energy and so on. Thus low conversion efficiencies are accumulated resulting in the use of only an extremely small fraction of the solar energy collected.

Meanwhile, large buildings have been constructed in urban areas and these buildings are in general built airtight in order to economize the energy required for air conditioning. As a result there has been a problem of how to provide highly reliable and dependable emergency stand-by lighting or illumination systems at emergency exits along emergency staircases and in totally enclosed rooms so as to ensure safe and quick evacuation of people inside buildings in the case of an emergency such as a fire, an earthquake or the like. Furthermore, there has been an increasing demand for inexpensive, safe and simple lighting or illumination systems for tunnels and mine pits.

In the conventional emergency stand-by lighting or illumination systems, there is provided a stand-by electric source such as batteries or generators independently of the commercial electric supply. In addition, emergency lamps must be provided independently of the lighting or illumination systems normally used. Thus the inspection and maintenance of the emergency stand-by lighting or illumination systems are very cumbersome and expensive. Furthermore, there is a fear that the stand-by electric sources and illumination lamps may be damaged in the case of an earthquake, and the service life of the electric source is in general short. Thus the conventional emergency stand-by lighting or illumination systems are not completely reliable. Especially in the case of the emergency stand-by lighting or illumination systems installed in large buildings, the reliability thereof is of great importance during the daytime when concentrations of people are extremely high. Thus the conventional emergency stand-by lighting or illumination systems have many problems to be overcome.

In the case of the lighting or illumination systems for tunnels and pits, electric lighting or illumination has been widely used so that the high cost of electricity presents a problem. When a private electric installation is used because for instance a commercial electric supply is not readily available or for other purposes, the installation cost as well as the maintenance cost becomes very high.

Meanwhile for use in optical communications systems which are much more efficient and economical, extensive research and development respecting optical fibers has been conducted. Now optical fibers are readily available which are highly transparent, with resultant reduction in transmission or propagation losses. In practice, bundles of optical fibers have been used for directing illuminating light from one place to another. Thus with the optical fibers or optical conductors the solar light energy collected may be transmitted from one place to another at a high efficiency. However, the optical fibers for optical communications use available in the market are in general about 0.1 mm in diameter. It is apparent that it is extremely difficult to transmit the highly concentrated solar light energy through an optical fiber of such extremely small diameter. When light from the Sun is focused through a conventional optical system, its image has a diameter far greater than about 0.1 mm so that the solar energy cannot be introduced into the optical fiber. Thus with conventional optical fibers, the effective transmission of the collected solar energy from one place to another is almost impossible in practice.

SUMMARY OF THE INVENTION

Accordingly, one of the objects of the present invention is to provide a lighting system utilizing the sunlight, which may collect the sunlight at one place and transmit the collected sunlight to a desired place where direct access to the sunlight is impossible, without the conversion of solar energy into electrical energy for transmission, whereby the illumination with the sunlight in a desired area may be suitably controlled and an area or a place where the direct access to the sunlight is impossible may be illuminated with sunlight.

Another object of the present invention is to provide a lighting system utilizing the sunlight wherein the sunlight may be advantageously used as a light source during the daytime: and only when the sunlight is not sufficiently available, an artificial light source may be used so that the consumption of electric energy may be drastically reduced.

Another object of the present invention is to provide the lighting system which may be considerably simplified and safeguarded against damages to such an extent hitherto never attainable by any conventional lighting or illumination systems and consequently the inspection and maintenance may be remarkably facilitated and simplified with the resultant reduction in running cost.

A further object of the present invention is to provide a sunlight or solar light energy collection system capable of collecting the sunbeam or solar energy at an extremely higher degree of efficiency hitherto unattainable by any prior art solar energy collection systems.

BRIEF DESCRIPTION OF THE DRAWINGS

FIG. 6 is a view used for the explanation of an embodiment of the lighting system of the present invention which is used for lighting or illuminating with the sun rays the areas shadowed by a building;

FIGS. 17–22 show further embodiments of the sunlight collector systems in accordance with the present invention;

FIGS. 23–25 are views used for the explanation of the sunlight collection systems in which the input end of the optical conductor may automatically follow the imaging point at which an image of the Sun is focused through an imaging system and which varies in position depending upon the elevation of the Sun;

FIGS. 32 and 33 are sectional views of sash windows incorporating therein the sunlight collection systems in accordance with the present invention.

DESCRIPTION OF THE PREFERRED EMBODIMENTS

Figure 1:
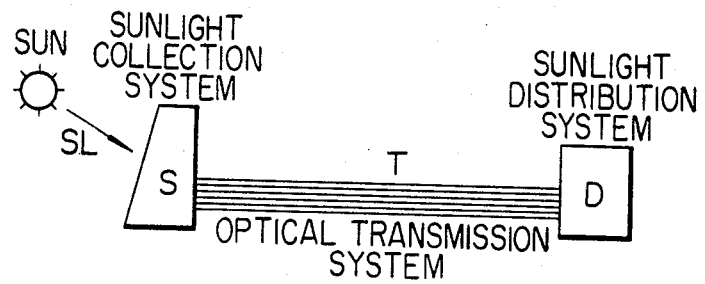
FIG. 1 is a view illustrating the underlying principle of the present invention.

Referring to FIG. 1, the lighting system utilizing the sunlight of the present invention comprises in general a sun light collection or capture system S for collecting or capturing the solar light energy SL from the Sun, an optical transmission system T consisting of for instance at least one optical fiber, and a sunlight distribution system D for distributing the sunlight transmitted through the transmission system T to various places. The examples of the sunlight collection system are shown in FIG. 2; those of the optical transmission system T, in FIG. 3; and those of the sunlight distribution system D, in FIG. 4.

Figure 2:
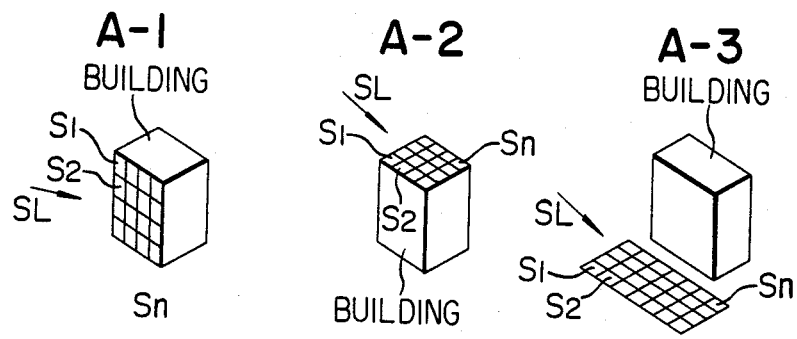
FIG. 2 shows various types of sunlight collectors used in the present invention.

Referring to FIG. 2, a matrix array of large number of solar energy or sunlight collectors $S_1$–$S_n$ may be installed on the wall of a building which is directed to the south as shown in FIG. 2, A-1 or on the roof as shown at A-2. Alternatively, the array of sunlight collectors may be installed in a space available near the building as shown at A-3. In this specification, these installations are referred to as "the vertical type", "the horizontal type" and "the peripheral type", respectively. The installation type is of course selected depending upon various conditions, especially upon the space available for installation of the sunlight collectors $S_1$–$S_n$. For instance, when the roof of the building is already occupied by other utilities such as electric substations, air conditioning systems and the like, the sunlight collectors may be installed on the south wall of the building which is more exposed to the sunlight than other walls. When there is no installation space available on the roof or on the south wall, a suitable space must be found around the building for the installation of the peripheral type sunlight collector system. In addition, any suitable combinations of the three types may be selected. For instance, the combination of the horizontal type and the vertical type may be used.

Examples of the sunlight collectors are shown in FIG. 2. Those shown at B-1 and B-2 are mounted on a tracking system which may always maintain the optical axis of a condenser lens 1 in line with the Sun. Those shown at B-3 and B-4 are of the dispersion type and are not mounted on a tracking system.

The sunlight collector shown at B-1 is such that the condenser lens 1 and an optical fiber cable 2 are formed as a unitary construction which is mounted on the tracking system (not shown). The sunlight collector shown at B-2 is such that the condenser lens 1 is fixed while the optical fiber cable 2 is mounted on the tracking system (not shown) so that the sunlight incident end of the optical fiber cable 2 may be at the point at which the condenser lens 1 focuses the sunlight rays. Therefore, the sunlight collector of the type shown at B-2 may be referred to as "the partial tracking sunlight collector" in this specification. The sunlight collector shown at B-3 is such that a reflecting-type optical collector 3 is attached to the optical fiber cable 2 in such a way that regardless of the height of the Sun the sunlight rays condensed by the condenser lens 1 on the optical collector 3 may be redirected to the incident or inlet end of the optical fiber cable 2. The sunlight collector of the type shown in at B-4 is such that the input end of the optical fiber cable 2 is diverged so as to capture as much sunlight rays passing through the condenser lens 1 as possible.

The selection of these types of sunlight collectors is also dependent upon various conditions. For instance, when a space for installation of a large number of sunlight collector is limited, the full-automatic tracking type sunlight collectors B-1 or the partial tracking sunlight collectors B-2 may be advantageously used. However, when a relatively large installation space is available, it is advantageous from the standpoint of cost to install a large number of non-tracking type sunlight collectors B-3 or B-4. Moreover, when it is possible to space apart the adjacent sunlight collectors by a sufficient distance, it is advantageous to use the sunlight collectors of the type shown at B-1 because even when the tracking accuracy of the tracking system upon which is mounted the sunlight collector B-1 is low, a sufficient quantity of sunlight may be captured. When the spacing between the adjacent sunlight collectors is limited, it is advantageous to use the sunlight collectors of the type shown at B-2 because the overall size of the sunlight collection system may be reduced.

The sunlight collector B-3 has a high sunlight collection efficiency because, as described elsewhere, the optical deflector 3 redirects the sunlight rays incident thereon to the input end of the optical fiber cable 2. In addition, because of its small size and installation space, the sunlight collection system may be reduced in overall size. The sunlight collector B-4 is advantageous in that its production cost is less and its reliability is high because of a minimum number of component parts.

Figure 3:
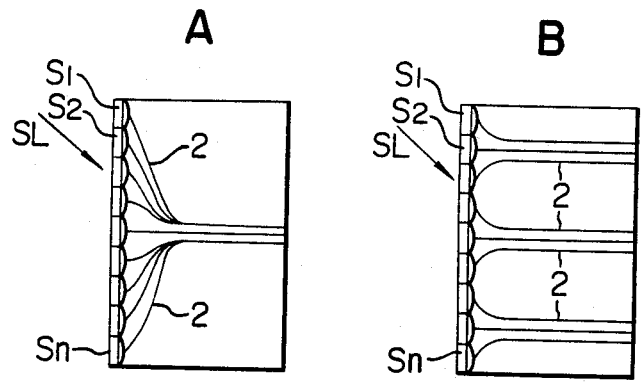
FIG. 3 shows two types of optical transmission lines used in the present invention.

Next referring to FIG. 3, the optical transmission system will be described in detail. The optical transmission system of the type shown in FIG. 3A is referred as "the single duct type" because a plurality of optical fiber cables or strands 2 extended from the sunlight collectors $S_1$-$S_n$ are bundled into a single "duct". On the other hand, the system of the type shown at B in FIG. 3 is referred to as "the multi-duct type" because the optical fiber cables 2 are bundled into a plurality of ducts. From the standpoint of maintenance, the single duct type is preferable to the multi-duct type, but the multi-duct type optical transmission system is advantageous over the single duct type in the individual transmission ducts require a less space and the sunlight may be distributed to various destinations. Therefore the selection of the single duct type A or the multi-duct type B is dependent upon also various conditions.

Figure 4:
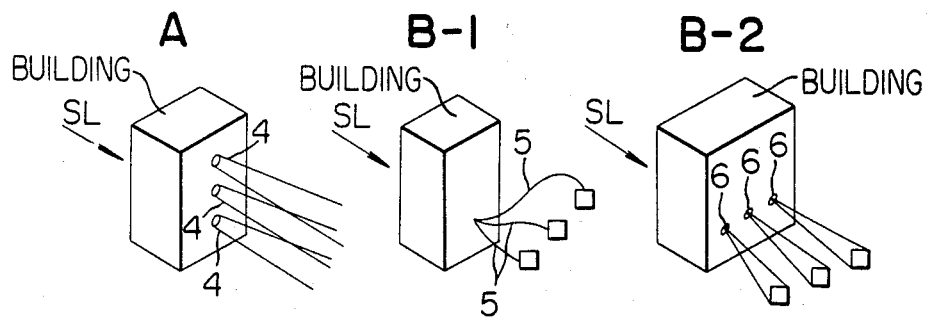
FIG. 4 shows sunlight distribution of illumination systems used in the present invention.

In FIG. 4 are shown some examples of the sunlight distribution system D. The system shown at A is referred to as "the uniform distribution type" because the solar energy is distributed uniformly over a relative large space through diffusers 4 optically coupled to the outlets, respectively, of the optical fiber cables 2. The two systems shown at B-1 and B-3 are referred to as "the selective distribution system" because the solar energy or sunlight is distributed to a plurality of relatively small spaces or spots. These systems are further classified as "the closed cable type" B-1 because the sunlight is distributed through a plurality of optical fiber cables 5 and as "the projection type" because the sunlight is directly projected through lenses 6 through the space to required spots.

When the sunlight collection systems, the optical transmission systems and the sunlight distribtution systems of the types described above are combined depending upon various conditions and requirements, an optimum sunlight utilization system may be established.

Figure 5:
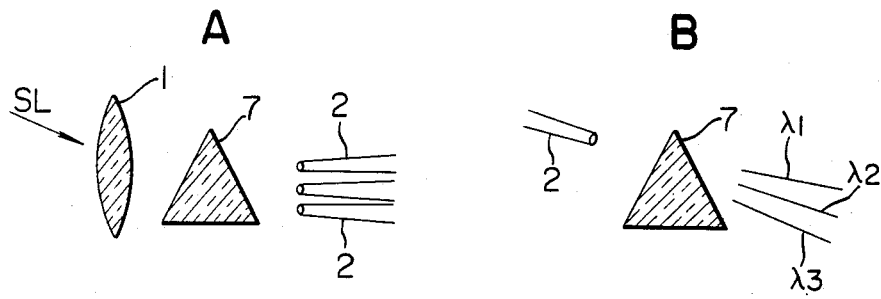
FIG. 5 shows arrangements for selecting the bands of desired wavelengths from the collected sunlight.

It frequently is desired to cut off some spectra of the sunlight or to use only a desired spectrum. Two examples of the light splitting system are shown in FIG. 5. The system shown in FIG. 5A is referred to as "the input splitting type" while the system shown at B, as "the output splitting type". In the former, a light splitting element such as a prism 7 is interposed between the condenser lens 1 and the input ends of the optical fiber cables 2 so that the sunlight collected by the lens 1 may be splitted into light of different wavelengths, $\lambda_1$, $\lambda_2$, $\lambda_3$ and so on which are in turn incident upon the respective input ends of the optical fiber cables 2. In the latter type shown at B, the prism 7 is interposed between the output end of the optical fiber cable 2 and the sunlight distribution system (not shown). In either type, the light of a desired wavelength or in a desired band may be transmitted to a specified spot. For instance, the light in the infrared range may be transmitted to a place where the supply of thermal energy is of importance. In like manner, the light in the visible range may be transmitted to a place where the supply of illumination light is of more importance. Thus, the full use of the solar energy may be attained.

The input splitting type shown at A is advantageous over the output splitting type B in that it becomes possible to use the optical fiber cables 2 which exhibit the least propagation losses to the light of different wavelengths. As a result, a high transmission efficiency may be obtained.

Next referring to FIG. 6, a sunlight utilization system will be described which may compensate for the loss of exposure to sunlight behind the building. The south wall of the building is 50 meters in height H and 40 meters in width W with a total area of $Sw = H \times W = 2000$ m$^2$. It is assumed that 50% of the south wall area be available for installation of the sunlight collectors. That is, the sunlight collector installation space $SL = Sw \times a/100 = 2000 \times 50/100 = 1000$ m$^2$, where a is a sunlight collector installation ratio in percent. When the elevation $\theta$ of the Sun or the incident angle is 30°, the effective sunlight-exposed area $S_R = S_L \cos \theta \times 1000 \times 0.87 = 870$ m$^2$. With the solar energy $Po = 0.5$ kW/m$^2$, the collected solar energy $P = Po \times S_R = 0.5 \times 870 = 435$ kW.

The building is 25 meters in depth so that the transmission system becomes approximately 30 meters in length. With the optical fibers of the power rating PF of 0.1 kW/0.1 mm$^2$, the required quantity of optical fibers $L_F = P/P_F \times L = 435/0.1 \times 30 = 130500$ (m $\times$ 0.1 mm$^2$). With the transmission efficiency n of 70%, the compensated area Sc (that is, the area behind the building which is distributed with the sunlight collected at the south wall of the building) becomes $Sc = S_R \times n/100 = 870 \times 70/100 = 609$ m$^2$. Therefore about 30% of the area which is deprived of the exposure to sunlight may be compensated for.

In addition to the above sunlight lighting system, the present invention may find a wide variety of applications. For instance (1) the sunlight system may be used biological utilization of solar energy. That is, the conditions for growth of both land and marine vegetation may be considerably improved so that more lands will be available for agriculture and forestry and the fish and the like may be raised in more large quantity under more favorable conditions. As a result, the production of various food may be tremendously increased in quantity.

(2) Because the sunlight may be transmitted to any places, the lattitude in design of residential houses, officies, hotels, factories, and so on may be considerably enhanced. Especially the designs of the underground structures will be revolutionalized.

(3) The solar light energy collected in the region of useful application may be transmitted to and distributed in the region where the solar light energy may not be used in practice from the standpoint of economy because of the unfavorable climate and geographical conditions and so on.

(4) The lighting system may completely replace the existing electric lighting or illumination system when sunlight is available.

(5) The lighting system may be easily used for lighting other places such as sunrooms, inside of the buildings and basements with natural light.

Figure 7:
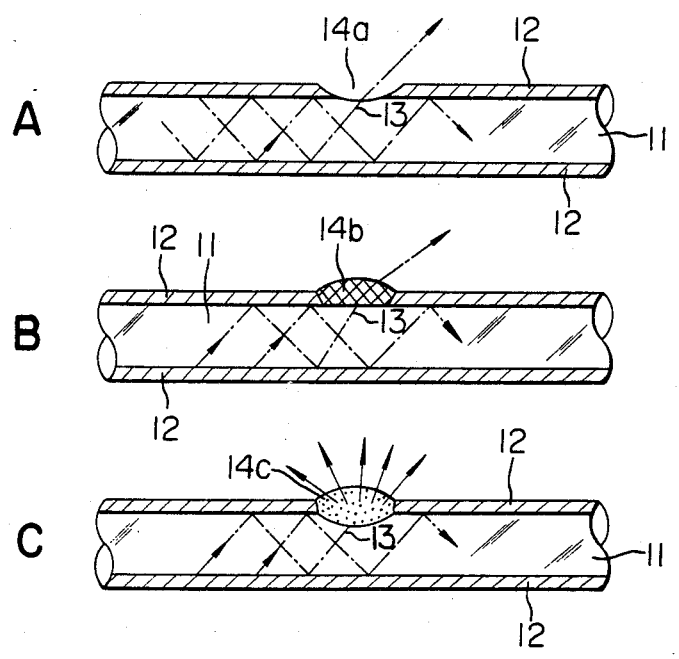
FIG. 7 shows optical conductors with optical diffusion holes through which the sun rays may be derived at desired points along the optical transmission line.

In FIG. 7 are shown the optical fibers used in the present invention. In general, the optical fiber comprises a core 11 and a cladding 12. Light passes the optical fiber in a zig-zag path indicated by the solid and broken lines 13. During the propagation through the optical fiber, it is diffused through a diffusion hole 14a, 14b or 14c when light is so reflected back from the cladding 12 as to be incident on the diffusion hole.

Figure 8:
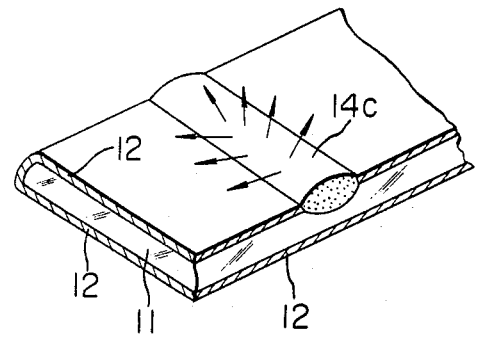
FIG. 8 shows a variation of an optical conductor with an optical or light diffusion hole which may be also used in the present invention.

FIG. 7 shows only a single optical fiber, but it is to be understood that many of them may be arranged in any suitable forms. For instance, a plurality of optical fibers may be arranged in side-by-side relationship into a belt of optical fibers. Alternatively, the optical fiber may be in the form of an optical thin film as shown in FIG. 8. The thin-film type of flattened optical fibers may be also arranged in side-by-side relationship into the form of a band. In general, the optical fibers have a circular cross sectional configuration, but they may have in any suitable cross sectional configurations. Moreover, the cross section of an optical fiber may be varied from one configuration to another throughout the length thereof.

The optical fibers in the form of a bundle must be separated from each other over the length including the light diffusion holes 14. The refractive index gradient of the optical fiber may be so carefully designed that light may emerge therefrom through the diffusion holes located at any points along the length of the optical fiber. In this specification, the diffusion holes does not refer to only the holes physically formed through the cladding 12, but refers to the portions of the cladding 12 through which light emerges out of the optical fiber. Therefore, as shown at A in FIG. 7, the diffusion hole 14a is in the form of a recess formed in the exterior surface of the cladding 12. Alternatively, it is in the form of a hole formed through the cladding 12 and thereafter filled with an optically transparent medium as shown at 14b in FIG. 7B. Furthermore, as shown in FIG. 7C and FIG. 8, the transparent optical element 14c may be such that it may scatter light as indicated by the arrows. In addition, the light diffusion holes 14 may be in any suitable shapes and be made of any suitable optical materials depending upon the desired light diffusion or illumination effects.

In the case of the light diffusion hole 14a and 14b, the direction of light emerging through the light diffusion hole 14a or 14b is uniquely determined by the angle of incidence of light ray incident on the light diffusion hole 14a and 14b. Therefore it is advantageous to use such light diffusion holes 14a or 14b or combinations thereof when it is desired to illuminate articles displayed in a shop window or to spot illuminate a sign or the like. On the other hand, the light diffusion hole 14c as shown in FIG. 7C or 8 scatters light so that it is adapted to be used when a uniform illumination is desired.

Next referring to FIG. 9, the light or illumination designs with the optical fibers of the types shown in FIGS. 7 and 8 will be described. Light emanated from a light source 16 is optically coupled through a lens 17 into an optical fiber 18 with light diffusion holes $R_1$-$R_n$ of the types described above with reference to FIGS. 7 and 8. The optical fiber 18 is extended through the spaces or spots to be illuminated. The intensity of light emerging from the diffusion holes R may be suitably varied by suitably selecting the area of the light diffusion hole R and the power of the light source 16 which is provided as an auxiliary light source which is used when no sunlight is available because of a bad weather. The light source 16 may be for instance a laser beam generator.

Figure 9:
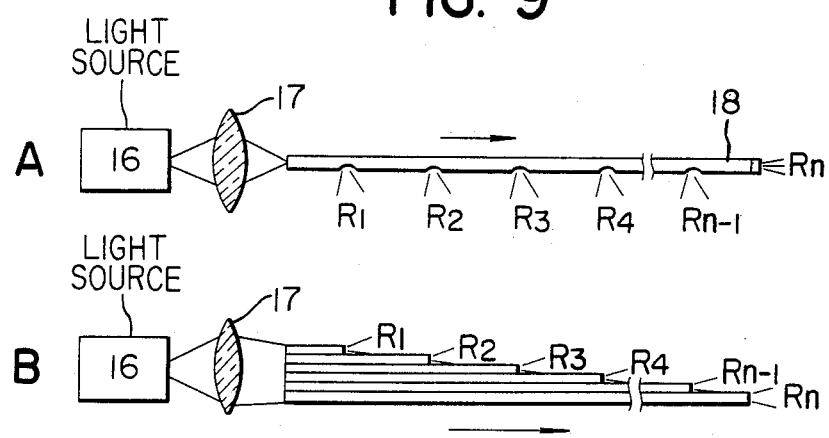
FIGS. 9 and 10 show three examples of sunlight illumination systems in accordance with the present invention.

In the lighting or illumination design shown in FIG. 9, a reflector may be positioned at the end of the optical fiber so that light may be reflected back into the optical fiber and may be diffused through the diffusion holes R, whereby the lighting or illumination efficiency may be considerably improved. Instead of providing the diffusion holes R along the length of the optical fiber as shown in FIG. 9A, light may be emerged out of the end of the optical fiber as shown in FIG. 9B.

Figure 10:
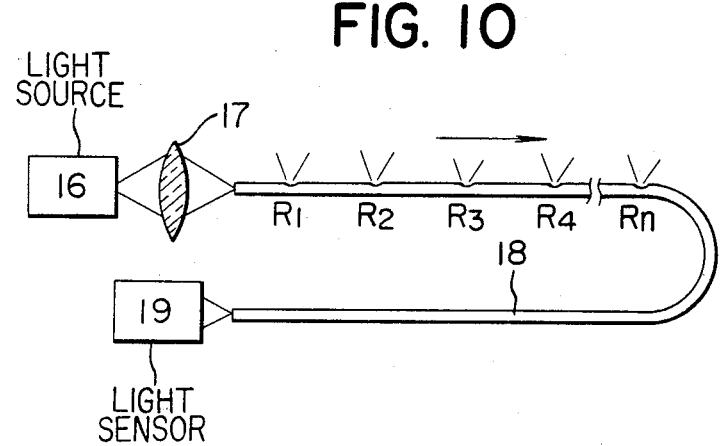

As shown in FIG. 10, a suitable light sensor 19 may be disposed at the end of the optical fiber so as to monitor the light propagation conditions as well as the operating conditions of the optical fiber, whereby the sunlight utilization system may be improved in both reliability and maintainability. Therefore, the lighting or illumination system as shown in FIG. 10 is adapted to be used an emergency lighting or illumination system which requires a higher degree of reliability in operation.

Next the uses of the sunlight lighting system of the present invention will be described in detail hereinafter.

Lighting or illumination for underground rooms and emergency exits and staircases:

The sunlight distribution system or the lighting or illumination system installed in an underground room or a totally enclosed room is optically communicated with the sunlight collection system or an artificial light source through the optical transmission system extended along an emergency exit and staircase. The light diffusion holes are provided along the optical transmission line so as to illuminate the emergency exit and staircase, especially its landings. The artificial light source is used when no sunlight is available. It is advantageous to illuminate with natural light or sunlight the underground room or totally enclosed room where the sunlight is not accessible. In the case of an earthquake or other disasters, the reliability of the stand-by lighting or illumination system is of most importance especially during the daytime when many people are in offices and shopping centers. The emergency stand-by lighting or illumination system of the present invention utilizes the Sun as a light source so that except an extremely bad weather, no failure of the light source will occur during the daytime. In addition, since no illumination device such as lamps is used, no failure of the emergency stand-by lighting or illumination system occurs due to the falling and breakdown of the illumination equipment.

It is preferable to use solar storage batteries as a power source for driving the automatic tracking system so that even in the case of an emergency a maximum sunlight illumination may be ensured and consequently the reliability factor may be further enhanced.

When no sunlight is available, the artificial light source is used. The lighting or illumination system of the present invention is very simple as compared with the conventional lighting or illumination systems, the damages to the optical fiber transmission system due to the shocks and vibrations may be avoided so that even when the artificial light source is used, the reliability of the emergency stand-by lighting or illumination system is by far higher than that of the conventional systems.

Lighting or illumination in tunnels and pits:

The optical fiber transmission lines are extended in general along the top walls of the tunnels or pits, and the light diffusion holes are provided at places where illumination is desired. The quantity of light emerging from the light diffusion holes may be progressively decreased from the entrance to the tunnel or pit by a suitable design of the optical transmission through the light diffusion holes or by progressively increasing the distance between the adjacent light diffusion holes as they are spaced apart from the entrance to the tunnel. Then, one who enters the tunnel may suitably adjust his vision so that an accident due to the sudden change in illumination intensity may be avoided. Conversely, the closer to the entrance of the tunnel, the brighter the illumination becomes so that in the case of an accident one may naturally follow the illumination toward the brighter direction and reach the entrance.

Spot lighting or illumination:

It is required to illuminate only limited areas spaced apart from each other along, for instance, a production belt conveyor system. In the conventional lighting systems, one lamp is installed for one area or spot so that the initial installation cost is considerably high. Furthermore, the costs for electricity and maintenance and repairs are also expensive. However, according to the present invention, the sunlight may be used and the optical transmission system of the type described elsewhere may be extended in such a way that the light diffusion holes may be provided for areas to be lighted. As a result, the initial installation cost as well as the maintenace cost may be drastically reduced. Furthermore, the sunlight may be used during the daytime so that considerable savings in electricity may be attained.

Information Transmission:

In addition to the sunlight collector system and the emergency stand-by artificial light source, one or more special artificial light sources such as laser generators capable of emitting various colored beams may be provided so that in the case of an accident in, for instance a tunnel, the illumination light may be flashed or changed in color so as to call the attentions of those working in the tunnel. Furthermore, various predetermined signals may be transmitted in terms of change in illumination light color. For instance, the change in color may notify the workers the work starting and ending time.

With the light transmission systems of the types described above with reference to FIGS. 7-10, one or more sunlight collection systems and one or more artificial light sources may be located in one or many places so that their maintenance may be much facilitated. Since only the light is transmitted, the light transmission system will not cause any serious accidents such as explosions even when they are extended through chemical plants handling inflamable materials or used for illumination of field sites for installing or repairing city or town gas pipe lines or utility tunnels for a sewage and so on. Therefore the lighting or illumination systems of the present invention may find a wide variety of applications in various fields. Since the sunlight is used, drastic savings in electricity may be attained, and highly efficient and effective natural light illumination effects may be obtained in the indoors where the access to the sunlight is impossible. Furthermore, as described elsewhere the lighting systems of the present invention are highly reliable and dependable in operation even in the case of a disaster.

FIG. 11A is a top view of another embodiment of the sunlight collector in accordance with the present invention, and FIG. 11B is a sectional view as viewed in the direction indicated by the arrows 11B of FIG. 11A. 21 is a top plate formed with a positive Fresnel lens 22; 23, a bottom plate assembled into a unitary construction together with a supporting frame 24 and the top plate 21; 25, a collector for collecting the sunlight collected by the Fresnel lens 22; and 26, an optical conductor for transmitting the light collected by the collector 25 to a desired place. FIG. 12 provides a plurality of said Fresnel lenses so as to further increase the sunlight collection capacity or contemplates to attain the reduction in size by shortening the distance between the top plate 21 and the bottom plate 23.

Figure 11:
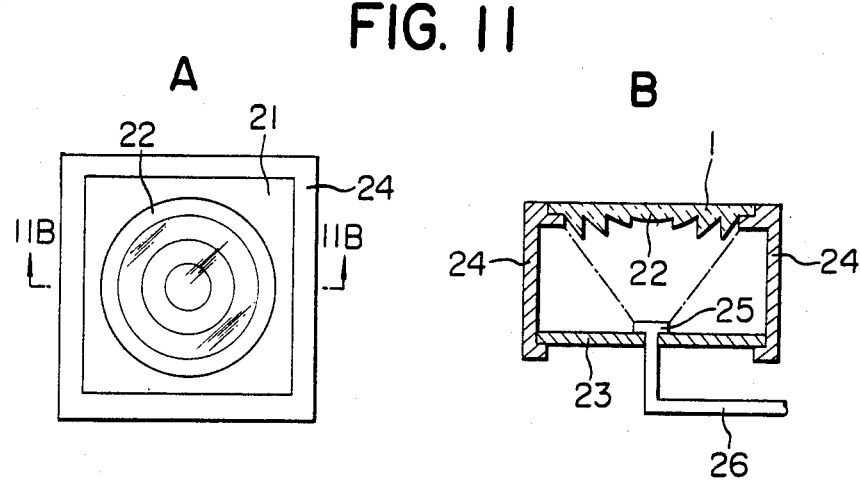
FIGS. 11–14 show sunlight collector systems utilizing Fresnel lenses in accordance with the present invention.
Figure 12:
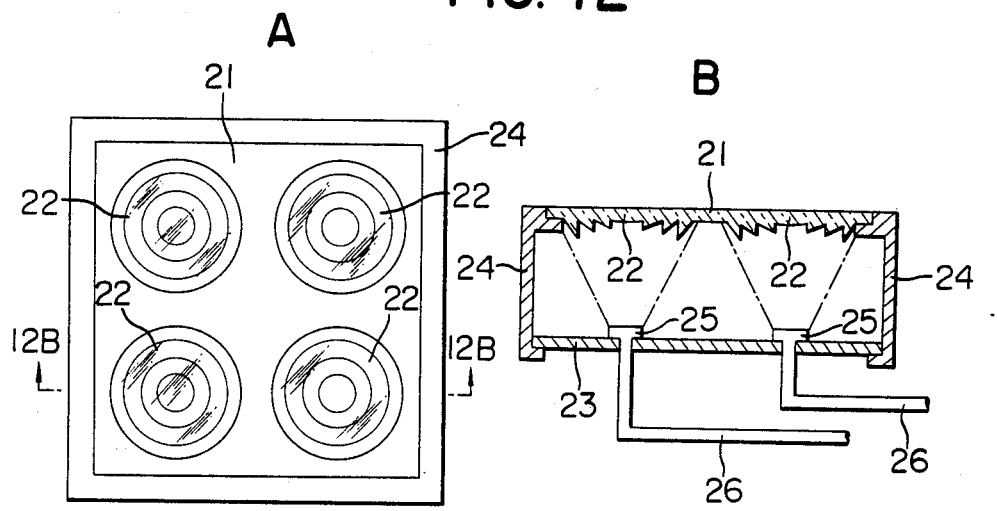
Figure 13:
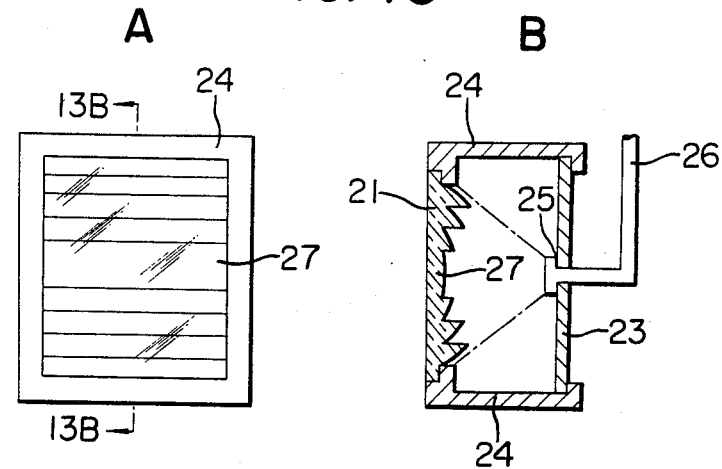
Figure 14:
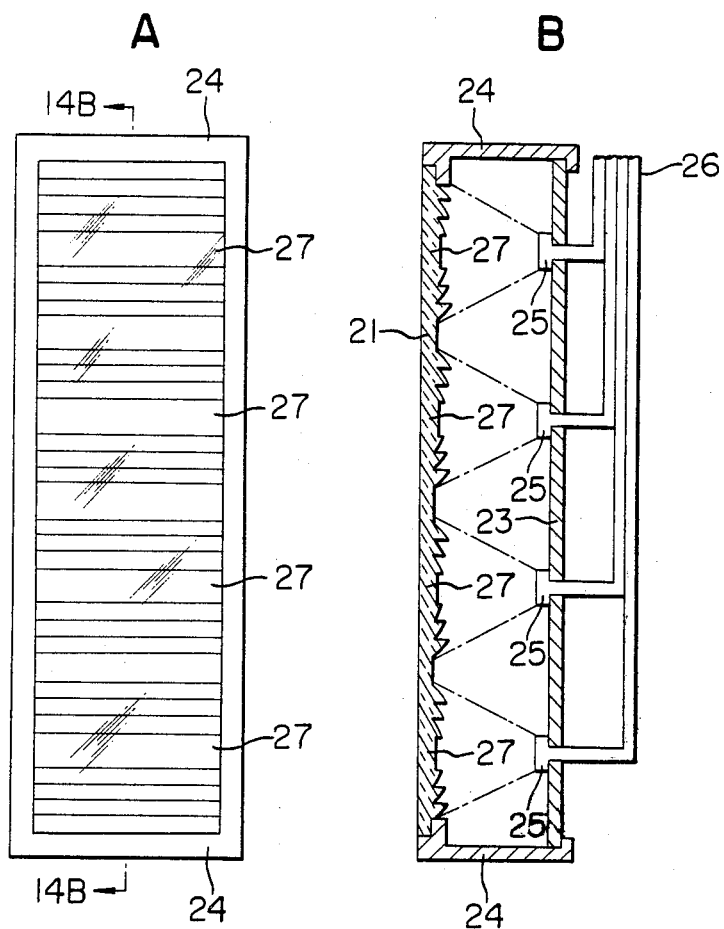

Instead of the circular Fresnel lenses shown in FIGS. 11 and 12, FIG. 13 uses a band-shaped Fresnel lens 27, thereby simplifying the fabrication of the top plate 21. As in the case of the FIG. 12, FIG. 14 provides a plurality of band-shaped Fresnel lenses so as to further increase the sunlight collection capacity or contemplates the reduction in size by shortening the distance between the top plate and the bottom plate.

Figure 15:
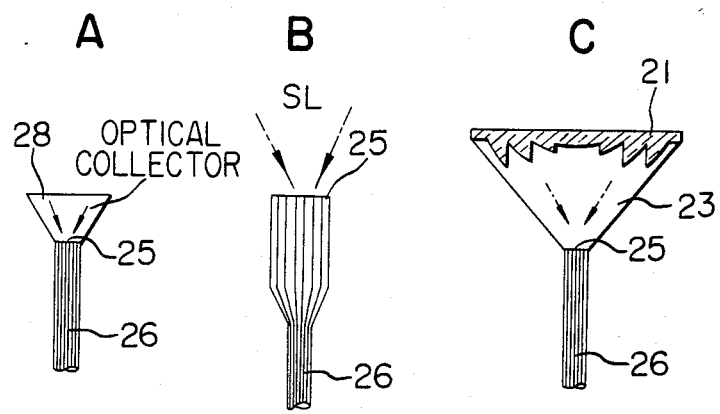
FIG. 15 shows the input ends of the optical conductors at which the images of the Sun are focused and through which the sun rays are coupled into the optical conductors.

FIG. 15 shows various examples of the collector 25. FIG. 15A is such that the sunlight collected by the Fresnel lens is directed by a tapered optical collector 28 to a light incident portion or light collection portion 25 of an optical conductor 26. FIG. 15B has an enlarged light incident portion of the optical conductor 26. FIG. 15C has a cup-shaped bottom plate so that the sunlight collected by the cup-shaped bottom plate is directed toward the light incident portion 26 of the optical conductor 26. According to these examples or embodiments, the light incident portion has redundancy so that the sunlight may be efficiently collected throughout the day.

Figure 16:
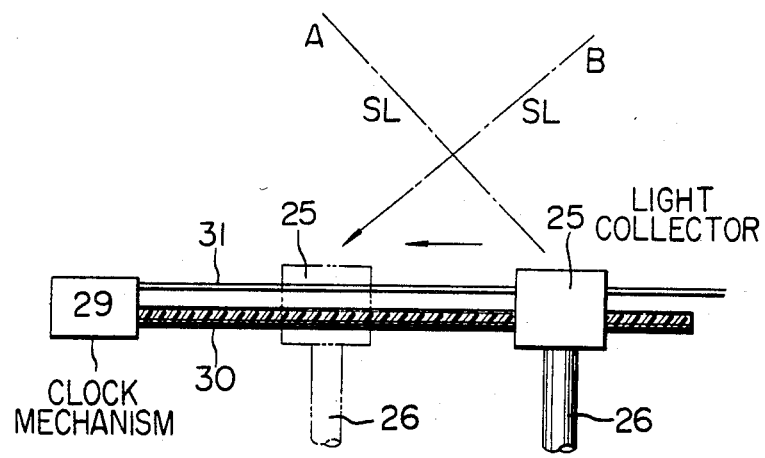
FIG. 16 is a view used for the explanation of a sun-tracking type sunlight collector system.
Figure 17:
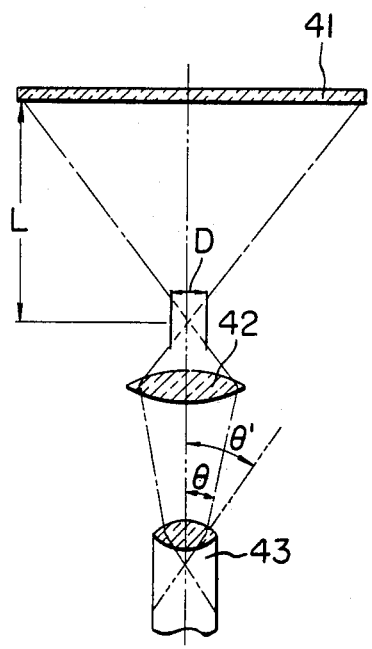

Referring to FIG. 16, it is taken into consideration that as the Sun moves from the morning to the noon and the evening, the focal point position of the lens is displaced. FIG. 16 shows an example of a simplified automatic focus tracking device so that the light incident portion may coincide with the focal point position of the lens. In FIG. 16, 29 is a clock mechanism or clock device; 30, a lead screw; 31, a guide rod so that when the sunlight is incident from the direction A in the morning, the light incident portion 26 is brought to the position indicated by the solid lines but when the sunlight is incident from the direction B in the evening, the light incident portion 26 is brought to the position indicated by the dotted lines. Then the sunlight may be more effectively collected throughout the day, and furthermore when the guide rod is so arranged as to be changed in position depending upon the elevation of the Sun; that is, depending upon the seasons, spring, summer, autumn and winter, the sunlight may be collected more effectively. FIG. 16 explained the example for causing the light incident portion to track the movement of the Sun, but is possible to displace the top plate or the lens instead of the light incident portion so that the collected light may be always made incident on the light incident portion. Furthermore, the more efficient sunlight collection may be attained by a combination of the automatic tracking device and the light incident portion as shown in FIG. 15. As is clear from the above explanation, according to the embodiments of FIGS. 11-14, the Fresnel lens or lenses are used in the sunlight collection optical system so that the lenses may be reduced in weight and thickness and the light collection capacity may be increased. Therefore, with a supporting frame or the like, the device may be made in the form of a unit so that it may be embedded in a building or may be used as a part thereof, whereby the drastic reduction in installation cost may be attained. FIG. 17 is an optical diagram for the explanation of a further embodiment of the sunlight collection system used in the present invention. In FIG. 17, 41 is a lens system for collecting the sunlight which is preferably comprised of one or more Fresnel lenses; 42, an optical system, which is in general called a relay lens and disposed adjacent to the focal point of the lens system 41; 43, an optical conductor which is disposed adjacent to the focal point position of the optical system 42 and is in general known as an optical fiber. As described elsewhere, the optical fibers for optical communications purposes are in general about 0.1 mm in diameter, and in order to drive all the sunlight collected into the optical conductor 43, 0.1 mm in diameter, it is required that the image of the Sun focused by the optical system 42 is less than 0.1 mm in diameter. Furthermore, in order that the light coupled into the optical conductor 43 may be transmitted or propagated as efficiently as possible; that is, with a minimum quantity of leakage, the angle $\theta$ of the light collected by the optical system 42 must be made less than an acceptance or a critical angle $\theta'$ of the optical conductor 43; that is, an angle at which the light may be propagated through the optical conductor 43 by total reflection.

Figure 18:
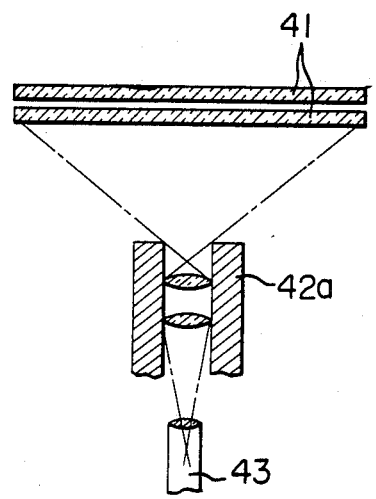

As described hereinbefore, in order to obtain an image less than about 0.1 mm in diameter of the Sun on the light entrance surface of the optical conductor 43, the optical system 42 with the focal length f less than 10 mm is required. If the angle of light incident to the optical conductor 43 is made less than the acceptance or critical angle $\theta'$ of the optical conductor 43; that is, the angle at which the light coupled into the optical conductor 43 may propagate therethrough by total reflection, the critical angle of the optical fibers now available in the market being in general between 30° and 35°, the diameter of the relay lens in the optical system 42 must be less than about 10 mm. Meanwhile, the Fresnel lenses now available in the market are in general 30 cm in diameter at the most. When this Fresnel lens is used to focus the Sun, the image becomes about 3 mm in diameter (D). Therefore, as described above, if the relay lens with the diameter of less than about 10 mm may be used, all of the solar energy of the sunlight collected by the Fresnel lens 41 may be coupled into the optical conductor 43. The total energy of the sunlight collected by the Fresnel lens with the diameter of 30 cm is about 70 W at the most so that about 40 W of pure light energy may be transmitted through the optical fiber with the diameter of 0.1 mm when the transmission loss is taken into consideration. So far only one Fresnel lens is used, but when two Fresnel lenses are cemented or otherwise stacked one upon another, the focal length L of the optical system 41 is reduced to one half so that a thin sunlight collector system may be obtained. So far the lens in the optical system 42 has been described as being positive, but it is possible to use an objective lens 42a, which is used in a microscope as shown in FIG. 18. Furthermore, as shown in FIG. 19, it is also possible to use an optical conductor 42b with a flat, convex or concave entrance surface 42' and an exit surface 42" in the form of a positive lens. Instead of the optical conductor 42b it is possible to use a self-focussing type optical conductor 42c such as a graded-index fiber as shown in FIG. 20. Furthermore, as shown in FIG. 21, the sunlight rays are made into parallel with each other through a negative lens 42d and thereafter are focused through a positive lens 42e. As shown in FIG. 22, the sun rays are made into parallel with each other through an optical guide-heat ray absorber 42f which is adapted to absorb the thermal energy, and thereafter are directed toward a positive lens 42e. In addition to the optical energy, the sunlight includes a large quantity of thermal energy so that when the objective lens of the type shown in FIG. 18 is used, it is preferable to couple the sunlight into the optical system 42 after removing the thermal energy of the sunlight through, for instance, a lens capable of the thermal energy absorption.

As is clear from the foregoing description, according to the embodiments shown in FIGS. 17-22, the sunlight collection systems may be realized by the effective combinations of the component parts readily available in the market.

In FIG. 23 is shown a still further embodiment of the sunlight collection system used in the present invention. In FIG. 23, 51 is a lens system for collecting the sunlight SL; 52, an optical conductor for receiving the sunlight energy collected by the lens system 51, the sunlight energy being transmitted through the optical conductor 52 to suitable places where the sunlight is used for illumination light or converted into the electric or thermal energy for further uses. 53 is a supporting frame for supporting the lens system and the optical conductor and is controlled by a device (not shown) so that the supporting frame may normally track the movement of the Sun. There has been proposed as one example of the sun tracking devices wherein a sunlight energy sensor is provided and in response to the output of the sensor the whole structure of the light collection system is made to track the Sun. However this tracking system has a defect that when the sunlight is interrupted by clouds or the like, the tracking point is once lost so that the succeeding tracking becomes very difficult. In order to overcome this defect, there has been proposed a system wherein the elevation of the Sun is predicted and the whole structure of the sunlight collection system is made to track the Sun by means of a clock mechanism. However, according to this tracking system, it is not certain that the collector is in precise alignment with the focal point position of the lens system so that the positive and efficient collection of the sunlight becomes impossible.

Figure 24:
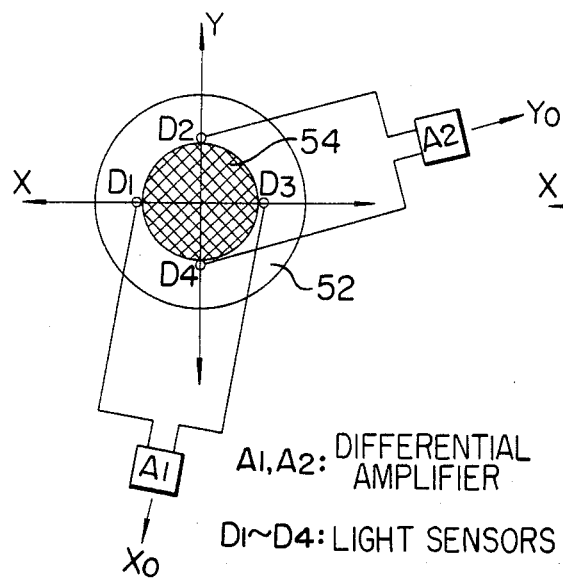

FIG. 24 is a view for the explanation of one example of the focused focal point detecting devices which are well adapted to make the sunlight collection system as shown in FIG. 23 to track the Sun by means of a clock mechanism. FIG. 24 is a view as viewed in the direction indicated by the arrows 24A of FIG. 23. In FIG. 24, a hatched area 54 is an image of the Sun focused through a lens system 51 (See FIG. 23). The size of the image may be obtained by calculation from the lens system used. Therefore, the light incident surface of the optical conductor 52 is selected so as to be equal to the size of the image 54 of the Sun, and the light incident surface is always maintained so as to be coincident with the sun image so that it is apparent that the sunlight energy may be coupled into the optical conductor in the most efficient manner. However, when the whole sunlight collection system is made to track the Sun only by means of the clock mechanism as described hereinbefore, it does not follow that the sun image and the light incident surface are coincident with each other and are deviated from each other as indicated by the broken lines. FIG. 24 is a view illustrating one example of the focal point position detecting device which may substantially overcome the problems described above. As shown in FIG. 24, a plurality of light sensors $D_1$-$D_4$ (four in this embodiment) such as optical fibers or photoelectric elements are equidistantly or equiangularly disposed around the periphery of the image of the Sun focused through the lens system 51, and the difference in quantity of received or incident light between the diagonally opposite light sensors $D_1$ and $D_3$ or $D_2$ and $D_4$ is detected by a differential amplifier $A_1$ or $A_2$. Then when the focal point position of the lens system 51 is deviated in the X-direction, the differential amplifier $A_1$ delivers the output signal $X_0$ which is representative of the deviation in the X-direction. In like manner, the differential amplifier $A_2$ delivers the output signal $Y_0$ which is representative of the deviation in the Y-direction. Therefore when the optical conductor 52 is so controlled as to deviate or rotate in the X- and Y-directions in response to the output signals from the differential amplifiers $A_1$ and $A_2$, the optical conductor 52 may be always maintained in the focal point position of the lens system 51.

The example as shown in FIG. 24 is adapted for use with the optical conductor 52 having a relatively large light incident area, but when the light incident area is small, a plurality of lens systems 51a and 51b are provided as indicated by broken lines in FIG. 23 so that a small image of the Sun may be focused and consequently all the sunlight energy collected may be coupled into the optical conductor. However, with this arrangement the quantity of light coupled into the optical conductor is considerably varied due to the deviation in the Z-direction of the focal point position so that when it is desired to use the light transmitted through the optical conductor 52 as illumination light, the illumination light flickers and consequently the illumination with better quality cannot be provided. The deviation in the Z-direction of the focal point position is caused by the time variations in the sunlight spectrum as observed on the ground. That is, as the time changes from the morning to the noon and the evening, the sunlight changes from the light containing a relatively large quantity of red spectrum to the white light and then to the light containing again a relatively large quantity of red spectrum. Furthermore the Z-direction deviation is also caused by the deformations of the casing exposed to the shower of solar energy.

Figure 25:
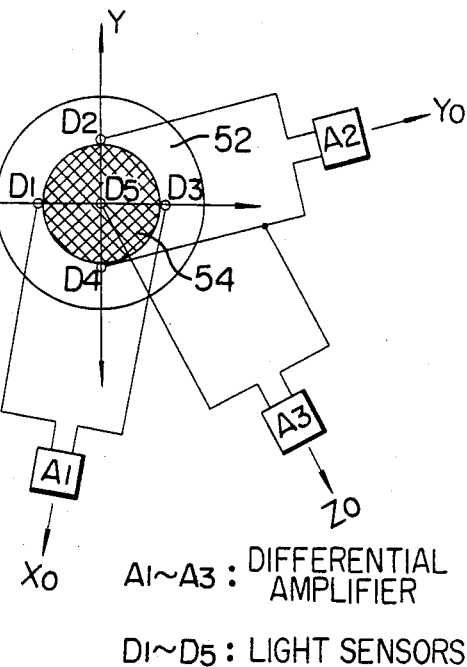

An embodiment shown in FIG. 25 is used for detecting the deviation in the Z-direction of the imaging point which is caused because of the reasons described above. As shown in FIG. 23, a plurality of light sensors $D_1$-$D_3$ are disposed along the periphery of the image 54 of the Sun, and an additional light sensor $D_5$ is located within the Sun image 54 itself. In response to the outputs from the light sensors $D_1$-$D_4$, the deviations in the X- and Y-directions of the focal point position are detected in the manner described above, and the deviations in the Z-direction of the focal point position is detected by a differential amplifier $A_3$ in response to the difference $Z_0$ between the output from the light sensor $D_5$ within the sun image on the one hand and the outputs from the light sensors $D_1$-$D_4$ around the sun image on the other hand. The position of the optical conductor 52 in the Z-direction is so controlled in response to the output from the amplifier $A_3$ that the difference $Z_0$ in absolute value may be maintained to a minimum. When the control in the Z-direction is effected normally, the quantity of light coupled into the light conductor 52 varies so that the stable supply of light becomes impossible. Therefore the control of the deviation in the Z-direction of the focal point is effected at a predetermined time interval or as shown in FIG. 23 a light sensor $D_6$ is provided which directly senses the sunlight energy so that when the sunlight energy detected by this light sensor is less, that is, when it is overcast, the control in the Z-direction is not effected. When the quantity of light incident on the light sensor $D_6$ is small, the difference $Z_0$ between the light sensors $D_1$ and $D_3$ or $D_2$ and $D_4$ is almost negligible so that the tracking is made only by means of the clock mechanism and the tracking by means of the light conductor in both the X- and Y-directions is not effected. As a result, the erratic operations may be avoided. Regarding to the example shown in FIG. 25, it has been assumed that the light incident surface be small in area, but it will be understood that the present invention is not limited to the size of the light incident surface of the optical conductor and that the end face as cut of the optical fiber may be used as a light incidence surface, an optical guide with a cone-shaped end may be used and a bundle of optical fibers may be used. Furthermore it is possible to eliminate the differential amplifier $A_3$ and to use either of the differential amplifier $A_1$ or $A_2$ in a time division manner. However in response to the output $Y_0$ from the differential amplifier $A_2$, the elevation of the whole sunlight collection system may be varied. In addition, instead of the light sensor $D_5$, part of light incident on the light conductor 52 may be used.

As is apparent from the foregoing description according to the embodiments shown in FIGS. 23-25 the sunlight may be collected very efficiently by the sunlight collection system which is very simple in construction. Furthermore especially when the sunlight is used for illumination, better quality illumination with less flickerings may be provided.

Figure 26:
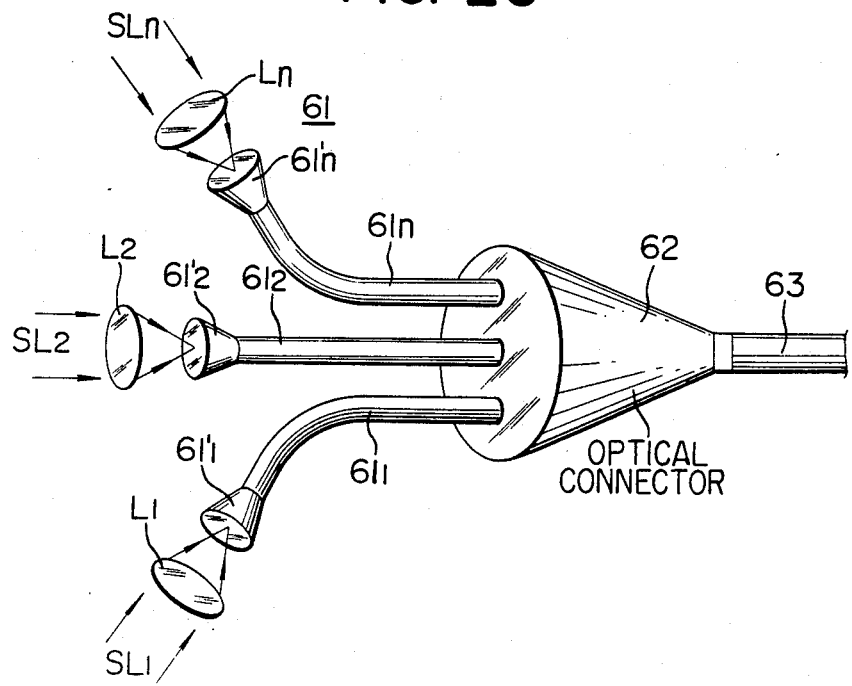
FIGS. 26–31 show further embodiments of the sunlight collection systems in accordance with the present invention.
Figure 27:
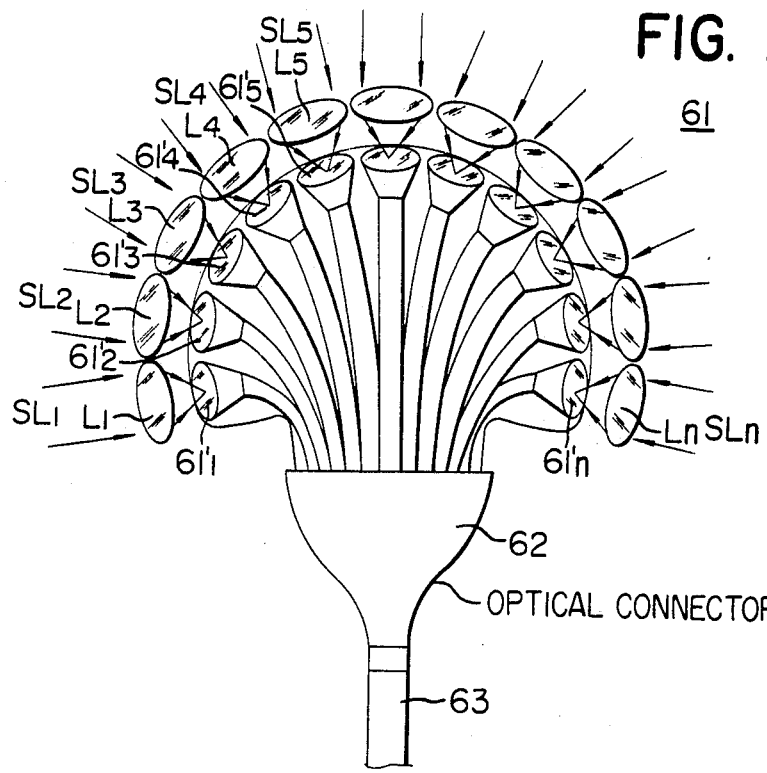

FIG. 26 is a view used for the explanation of the underlying principle of a yet another embodiment of the sunlight collection system used in the present invention. The sunlight collection system may collects efficiently a considerable quantity of sunlight not only in a fine day but also a cloudy day. In FIG. 26, 61 is a sunlight collector; $61_1$-$61_n$ and 63, optical conductors such as optical fibers; 62, a connector for coupling light rays transmitted from the optical conductors 61 into a single optical conductor 63. Light incident portions $61_1'$-$61_n'$ of the optical conductors $61_1$-$61_n$ are oriented in various directions. For instance, the optical conductor $61_1$ is so oriented to capture the sunlight from the direction indicated by the arrows $SL_1$ through a lens $L_1$; the optical conductor $61_2$, the sunlight from the direction indicated by the arrows $SL_2$ through a lens $L_2$; and so on. The sun rays transmitted through the optical conductors 61 are coupled through the connectors 62 into the single optical conductor 63 through which the sun rays are transmitted to the desired positions so as to be used for various purposes. Therefore when the light incident portions or light input ends of the optical conductors $61_1$-$61_n$ are arranged in the form of a semisphere as shown in FIG. 27, the sun rays from all directions may be coupled into the optical conductor 63.

Figure 28:
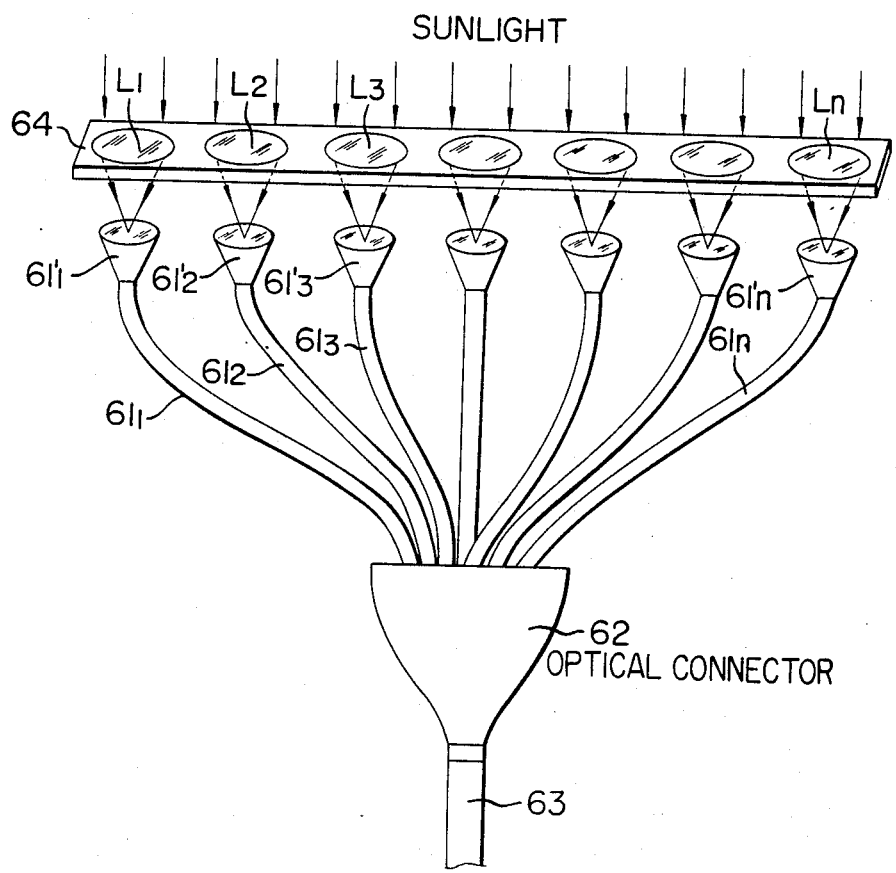

FIG. 28 is a view used for the explanation of a still further embodiment of the present invention. A plurality of lenses $L_1$-$L_n$ are arranged in one row on a base 64 so that they focus the images of the Sun on the incident or input ends $61_1'$-$61_n'$ of the optical conductors $61_1$-$61_n$. The base may be mounted on a tracking device so as to track the Sun, thereby more efficiently collecting the sunlight.

Figure 29:
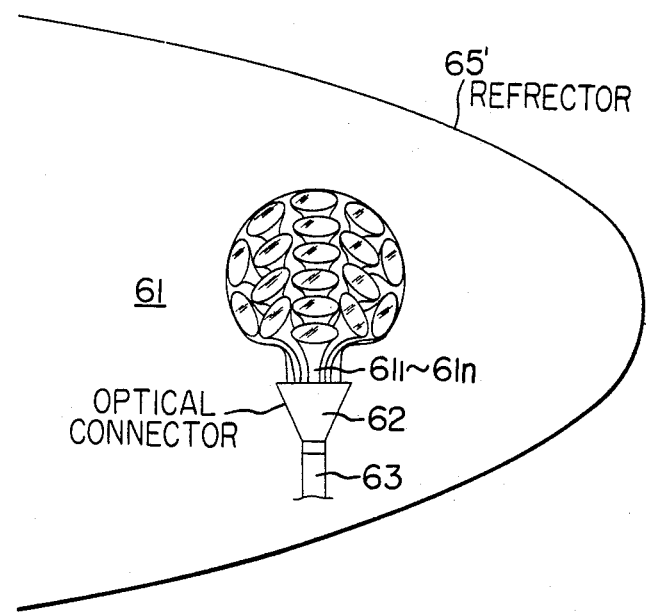
Figure 30:
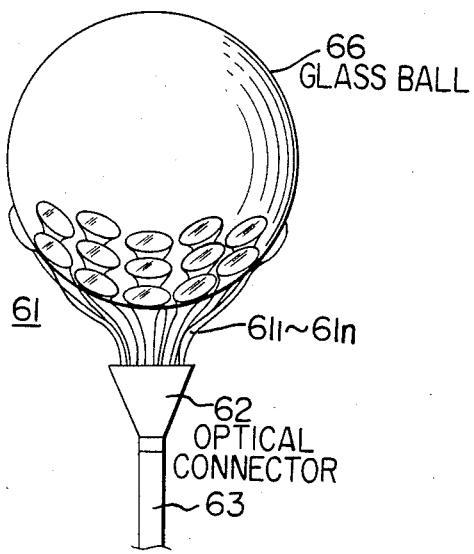

FIG. 29 is a view used for the explanation of an embodiment of the present invention. As shown, the construction is much simplified because the sun rays are reflected by a parabolic reflector 65 so as to be incident upon the light incident or input ends of individual optical conductors $61_1$-$61_n$. FIG. 30 shows a variation of the sunlight collection system shown in FIG. 29. Instead of the parabolic reflector 65, a spherical glass bulb 66 is used. In both the embodiments shown in FIGS. 29 and 30, the angular position of the sunlight collector 61 may be varied so as to track the Sun in a fine day so that the efficient sunlight collection may be achieved.

Figure 31:
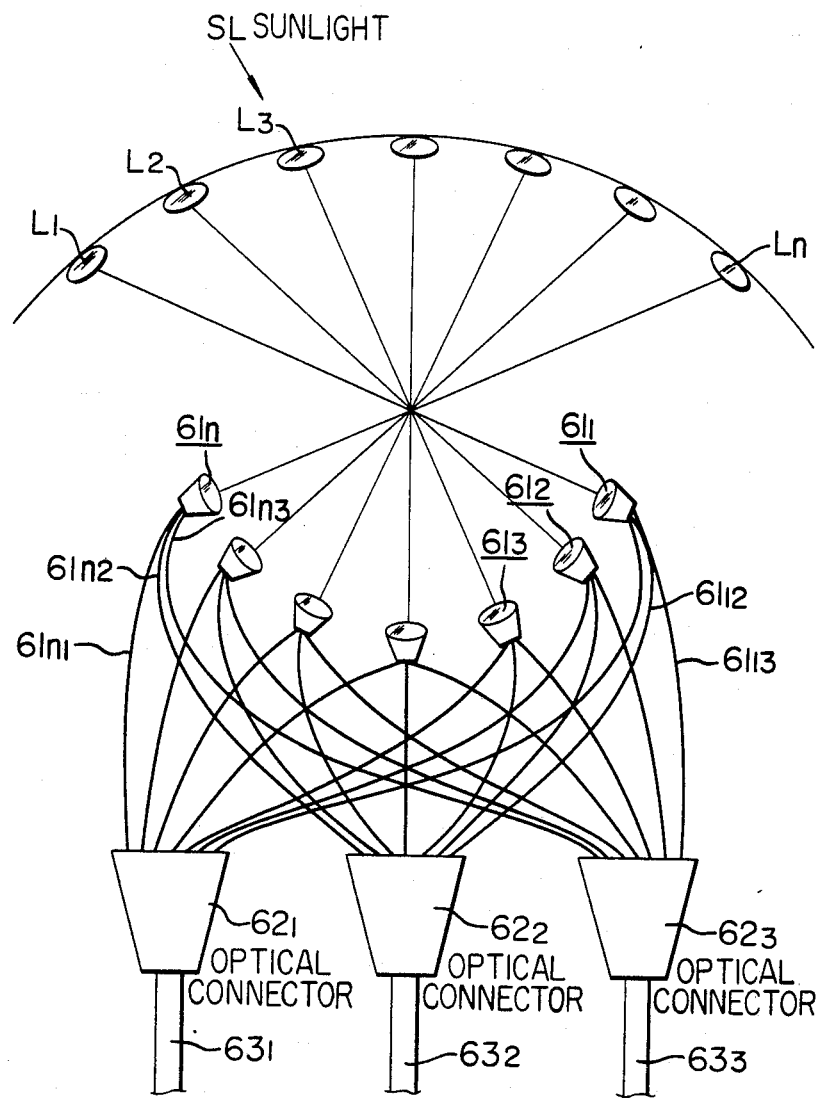

FIG. 31 shows also an embodiment of the present invention. In FIG. 31, $L_1$-$L_n$ are lenses which are arranged on a common spherical surface, and optical collectors $61_1$-$61_n$ are disposed in optically opposed relationship with mating lenses. The collectors $61_1$-$61_n$ are similar in construction to those shown in FIG. 27. The optical conductors of the collectors are distributed and coupled through the couplers 62 into the common optical conductors 63. Let it be assumed that in a fine day the sunlight be coming from the direction $S_L$. Then the sunlight focused through the lens $L_3$ and captured by the collector $61_3$ is largest in quantity. However, according to the present invention, the solar energy received by the collector $61_3$ is distributed through the optical couplers or connectors 62 into the three transmission conductors 63. As a result, the quantities of light rays transmitted through the optical conductors 63 are same. When it is cloudy, the sun rays are focused through all lenses $L_1$-$L_n$ and distributed among three optical conductors 63.

So far the input ends $61_1$-$61_n$ have been shown as being circular, but it is to be emphasized that when the input ends are hexagonal in shape, a largest number of collectors may be arranged in a limited spaced as is well known. As a result the sunlight collector assembly or system may be extremely compact in size.

According to the present invention, the sunlight may be collected from every direction so that the sunlight may be collected efficiently in a large quantity not only in a fine day but also in a cloudy day. In addition, the sunlight collected by a large number of optical collectors is distributed through the connectors or couplers into the optical transmission lines $63_1$-$63_3$ so that the optical conductors may be reduced in quantity with the resultant reduction in installation cost.

FIG. 32 shows a design for collecting the sunlight through a sash window. A window pane 71 is called an optical refraction window pane because it is formed with a plurality of optical refraction elements 72 which are in the form of a positive lens in this embodiment. The optical refraction window pane 71 and an ordinary flat window pane 73 are securely supported in a frame 74 and spaced apart from each other by a suitable distance. The optical refraction window pane 71 is oriented without while the window pane 73, within. The sunlight $SL_1$ incident on the optical refraction window pane 71 is refracted through the positive lenses 72 so as to be focused on an optical collector 75 disposed within the frame 74 between the window panes 71 and 73 and optically connected to an optical conductor 76. As a result the sunlight may be transmitted to any desired place within a building through the optical conductor 76 for various purposes. Of various utilizations of the sunlight transmitted into the building, the most effective use is to use the transmitted sunlight for illumination in a dark place without any conversion of the solar light into any other forms of energy.

FIG. 33 is a sectional view in elevation of an embodiment of the present invention. As with the case of FIG. 32, the sun rays $SL_1$ incident on the optical refraction window pane 71 are refracted through the positive lenses 72 thereof in the direction $SL_2$ so as to be reflected by an inclined reflecting mirror 77 at the bottom of the frame 74 between the outer and inner window panes 71 and 73 to the optical collector 75 mounted on the top wall of the frame 74 and optically connected to the optical conductor 76. The embodiment shown in FIG. 33 is advantageous in that the spacing between the outer optical refraction window pane 71 and the inner flat window pane 73 may be reduced and consequently the sash window may be reduced in thickness.

In the embodiments shown in FIGS. 32 and 33, the scattering of the sun rays is least when an optical axis of every positive lens 72 is in line with the sunlight $SL_1$. However, the elevation of the Sun varies from one region to another and throughout the year so that it is preferable that the optical axes of the refraction elements or positive lenses 72 may be variable. Alternatively, optical refraction window panes may be provided which have optical refraction elements 72 with different optical axes so that an optimum optical refraction window pane may be selectively used depending upon a season or a region. As a result the sunlight may be collected in the most efficient manner throughout the year and regardless of the geographical differences. Furthermore, the optical collector 75 and the reflecting mirror 77 may be so designed and constructed as to track the Sun so that a maximum quantity of sunlight may be collected. When this sun tracking scheme is combined with the optical refraction window pane capable of varying its optical axis as described above or with a replaceable optical refraction window pane of the type described above, the more efficient sunlight collection may be achieved.

The solar energy which is not trapped by the sunlight collection system of the types described above is trapped in the space between the outer and inner window panes 71 and 72. Therefore it is economically advantageous to utilize the solar energy thus trapped for various purposes. Furthermore instead of the ordinary flat window pane 73, a radiation energy absorbing window pane may be used so that the most efficient storage of solar energy may be achieved in the space between the outer and inner window panes 71 and 73. As described above, when the solar energy which is not collected by the sunlight collection system is stored in the space and utilized the more efficient use of the solar energy may be attained. Moreover the room temperature is not adversely affected by the solar energy so that the efficiency of the air conditioning may be remarkably improved and the adjustment of the air conditioning may be considerably simplified. Instead of the ordinary flat inner window pane 73, a polarized window pane may be used so as to avoid unpleasant glare due to the scattering of the sunlight As described above, according to the present invention, the solar energy is captured through a sash window so that no special sunlight collection system may be needed and the problem of an installation space may be eliminated. Furthermore, the solar energy which is not captured by the sunlight collection system may be utilized as the thermal energy as described above so that the sunlight utilization system of the present invention may be remarkably improved in efficiency to such an extent hitherto unattainable by the conventional sunlight or solar energy utilization systems.

So far various methods for utilizing the solar energy as light or light energy have been described in detail. It is impossible to make full use of the solar energy over its full wavelength so that a considerable quantity of the solar energy reaching the Earth has been wasted for nothing. Therefore the present invention further provides a solar energy utilization system which may enable the use thereof in the form of light or thermal energy as needs demand. This unique system will be now described in detail with particular reference to FIG. 34. The sunlight SL is collected by means of the sunlight collection system of the type already described with particular reference to FIGS. 11-14. That is, the sunlight collection system comprises in general a casing 83, a sunlight collection lens system 81 and an optical collector 82 upon which is focused the Sun through the lens system 81 and is optically coupled to an optical casing 83 which in turn transmits the collected sun rays to a desired place for various utilization purposes described elsewhere. Thus the solar energy may be used as the light energy. Because of the deformations of the lens system 81 and the casing 83 both of which are exposed to the shower of the solar energy and due to the time variations in the Sun's spectrum it does not follow that all the solar energy incident upon the outermost element of the lens system 81 can be collected completely of 100% on the optical collector 82. In practice, a considerable part of the incident solar energy is dissipated for nothing in the form of the thermal energy. The embodiment shown in FIG. 34 contemplates the maximum use of the thermal energy of the incident solar energy. To this end, the casing 83 is made air-tight and the air in the air-tight casing 83 is recirculated by means of a pump 84 through a heat exchanger 85. That is, part of the solar energy passing through the lens system 81 heats the air in the casing 83, and the heated air is forced to pass in the form of bubbles through a body of water in the heat exchanger 85 so as to make the heat exchange between the water and the air. As a result, the temperature of the water in the heat exchanger 85 is gradually increased. Hot water thus obtained may be supplied directly to a suitable destination through a hot water supply pipe 88 or may be temporarily stored in a hot water storage tank 89 for later use. The air emerging from the heat exchanger 85 is returned into the casing 83 through an eliminator 86 which dehumidifies the air. Thus the air is recirculated as the solar energy carrier. Since the air is cleaned with the water when it passes through the heat exchanger 85 and is further dehumidified by the eliminator 86, it will not cause any contaminations of the interior wall surfaces of the casing 83 and the lens system 81 so that the solar energy transmission efficiency of the lens system 81 may not be adversely affected by the recirculation of the air. As a result a maximum utilization of the incident solar energy becomes possible.

Figure 34:
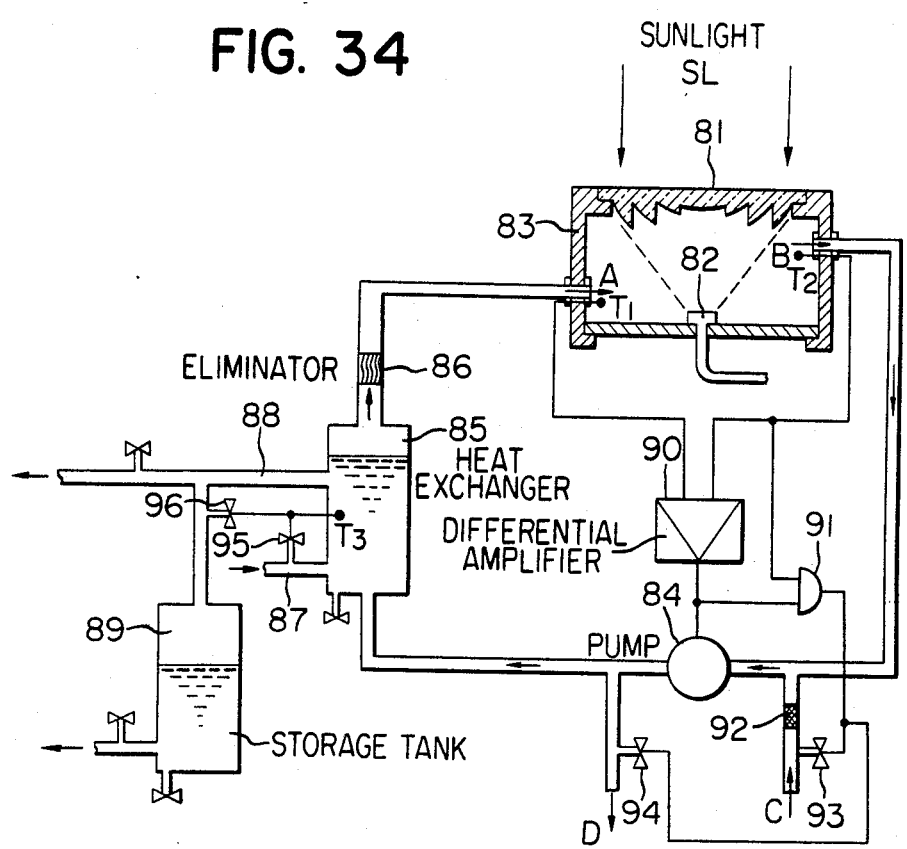
FIG. 34 is a diagrammatic view of a solar energy utilization system in accordance with the present invention which may enable the uses of both light and thermal energies thereof.

In order to ensure the maximum use of the solar energy, the solar energy utilization system shown in FIG. 34 further incorporates a control system comprising a temperature sensor $T_1$ so located as to monitor the temperature adjacent to the air inlet A into the casing 83, another temperature sensor $T_2$ so located as to monitor the temperature adjacent to the air outlet B from the casing 83, a differential amplifier 90 operatively connected to both the temperature sensors $T_1$ and $T_2$, and AND gate 90 having two inputs connected, respectively, to the output of the differential amplifier 90 and the output of the temperature sensor $T_2$, and first and second control valves 93 and 94 operatively connected to the output of the AND gate 91. The output of the amplifier 90 is also connected operatively to the pump 84 so that in response to the output from the former the pump 84 controls the flow rate of the air. In case of the abnormal temperature rise in the heat exchanger 85, in response to the output from AND gate 91, the first and second control valves 93 and 94 are opened so that the air from the surrounding atmosphere may be admitted into the air circulation passage from the inlet C and through a filter 92 while the excessively heated or overheated air is discharged through the exhaust outlet D, whereby the safety of the solar energy utilization system may be ensured.

In addition, a temperature sensor $T_3$ is so positioned as to monitor the temperature of the water in the heat exchanger 85 so that when the temperature reaches a predetermined level, the output signal from the temperature sensor $T_3$ causes control valves 95 and 96 to open so that the hot water may be charged into the hot water storage tank 89 while fresh water is admitted through a water inlet pipe 87 into the heat exchanger 85. As a result water in the heat exchanger 85 may be prevented from overheating and consequently generating too much steam in excess of the capacity of the dehumidifier 86, thereby preventing the intrusion of steam into the casing 83.

As described hereinbefore, according to this embodiment, both the light and thermal energies of the solar energy may be efficiently utilized. Contamination of the lens system may be substantially eliminated so that the cleaning frequency may be increased and the maintenance may be much facilitated.

So far the solar energy utilization system has been described as being provided with only one lens system 81 and one optical collector 82, but it is to be understood that both of them may be increased in number as needs demand. In addition, the casing 83 may be constructed with the structural units of a building or may be constructed within a building.

What is claimed is:
1. A solar lighting system, comprising:
at least one optical fiber light distribution means comprising (i) an optically transparent core having a lateral surface, a light receiving end and another end remote therefrom, and having a refractive index such that the light is reflected toward the surface thereof at predetermined points, (ii) an optical cladding layer substantially surrounding said core for cooperating with said core to confine light being transmitted through said fiber, to said core, and (iii) a plurality of light diffusion holes disposed at said predetermined points in said cladding intermediate said ends for permitting light to escape from said core, each of said holes being filled with a transparent optical medium having a larger refractive index than that of said core; and
optical lens means for coupling sunlight into the light receiving end of said light distribution means.
2. A lighting system according to claim 1, wherein said transparent optical medium directs the escaping light in a particular direction.
3. A lighting system according to claim 1, wherein the transparent optical medium in at least one of said holes scatters the escaping light.
4. The lighting system according to claim 1, 2 or 3, wherein said core is circular in cross-section over at least a part of its length.
5. A lighting system according to claim 1, 2, or 3, further comprising an auxiliary light source disposed at the light receiving end of said core for use when there is no sunlight.

6. The lighting system according to claim 5, further comprising light reflective means disposed at said other end of said core for reflecting light back toward said light receiving end thereof.

7. A lighting system according to claim 5, wherein said light distribution means comprises a number of optical fibers each having said core and cladding layer, each fiber having an end terminating at one of said predetermined points for radiating light therefrom.

8. A lighting system according to claim 5, further comprising a light exit at said other end of said core and a light sensor disposed thereat for monitoring light propagation conditions and controlling said light source responsive thereto.

9. A lighting system according to claim 1, 2, or 3, wherein said core comprises an optically transparent thin film.

10. The solar lighting system of claim 1 comprising a plurality of optical lens means, each of which couples the sunlight to one of a plurality of optical collectors, each of said optical collectors being optically connected to each of a plurality of optical connectors associated with each of a plurality of optical fiber light distribution means whereby each light distribution means receives sunlight from all of said lenses and collectors.

* * * * *